(12) United States Patent
Voona (10) Patent No.: US 9,549,053 B2
(45) Date of Patent: Jan. 17, 2017

(54) APPARATUS AND METHOD FOR TESTING PORTABLE DEVICES

(71) Applicant: Cellco Partnership, Basking Ridge, NJ (US)

(72) Inventor: Thirumalarao Voona, Somerset, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 469 days.

(21) Appl. No.: 14/068,171

(22) Filed: Oct. 31, 2013

(65) Prior Publication Data

US 2015/0115987 A1    Apr. 30, 2015

(51) Int. Cl.
*H04M 1/24* (2006.01)
(52) U.S. Cl.
CPC ........... *H04M 1/24* (2013.01); *H04M 2250/22* (2013.01)

(58) Field of Classification Search
None
See application file for complete search history.

(56) References Cited

U.S. PATENT DOCUMENTS

| | | | |
|---|---|---|---|
| 6,317,313 B1* | 11/2001 | Mosgrove et al. | 361/679.3 |
| 7,324,642 B2* | 1/2008 | Pletikosa | 379/433.12 |
| 8,077,453 B2* | 12/2011 | Swan et al. | 361/679.41 |
| 8,439,191 B1* | 5/2013 | Lu | 206/320 |
| 8,479,915 B2* | 7/2013 | Chen | 206/320 |
| 2010/0230301 A1* | 9/2010 | Fellig | 206/232 |
| 2014/0128132 A1* | 5/2014 | Cox, III | 455/575.8 |

* cited by examiner

*Primary Examiner* — Robert R Raevis (57) ABSTRACT

An apparatus is disclosed for testing portable devices. The apparatus includes a base upon which the portable device is mounted, and a top mold which fits over the base to immobilize the portable device. Templates can also be formed on the top mold or base. The templates contain test patterns that are defined by a plurality of apertures. A stylus is used to test the portable device by engaging or contacting different locations through the apertures in the test pattern.

13 Claims, 7 Drawing Sheets

APPARATUS AND METHOD FOR TESTING PORTABLE DEVICES

BACKGROUND INFORMATION

An emerging trend in today's society is the use of portable devices such as mobile phones, tablets, portable gaming units, personal digital assistant (PDA), tablet computer, etc. Additionally, the mobile phone can be a smartphone, cellular phone, wireless phone, radiophone, satellite phone, etc. These devices often include sufficient computing power to allow users to perform tasks well beyond basic telephone calls, task management, and calendar maintenance. For example, modern mobile telephones allow users to do more than communicate by voice. Users can access various networks such as, for example, the Internet and home/public Wi-Fi. Once connected to the network, users are able to access substantially the same information available through a desktop or laptop computer. Additionally, users have access to significant libraries of applications (or apps) that include games, utilities, etc. Tablets are also available with significant computing power and connectivity to allow users to perform numerous tasks which traditionally required a desktop or laptop computer. These tablets also run operating systems that are the same as, or similar to, mobile phones, thereby providing access to numerous apps as well.

Modern portable devices, such as mobile phones and tablets, typically include a user interface consisting of buttons, touch responsive surfaces, and a touch responsive screen. These features allow a user to quickly and easily operate the device using their hands. For example, certain navigation, selection, and control features can be provided on the face and sides of the portable device to control power, volume, application launch, immediate return to a particular screen, etc. Portable devices such as gaming units can further include control buttons and/or pads to play different games. Thus, an individual portable device can include various combinations of such features.

As these portable devices are continually operated, problems can sometimes begin to develop with the interface, thereby requiring replacement. These problems can result from extended and repeated use, as well as manufacturing defects. Portable devices that are returned to a manufacturer are often subjected to tests in order to reproduce the failure which resulted in return of the portable device. One of the problems associated with testing the portable device is the inconsistency of the results that can be obtained by different operators. For example, a particular button may fail only if engaged in a specific manner. Similarly, a touch responsive control may have damage that is limited to a small portion of the portable device. Consequently, variations in test results can occur based on, for example, the size of an operator's hand, the amount of pressure applied, etc. Based on the foregoing, there is a need for an approach to achieve consistent results when testing a portable device, regardless of the operator.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus and method for testing portable devices are described. In the following description, for the purposes of explanation, numerous specific details are set forth in order to provide a thorough understanding of the disclosed embodiments. It is apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
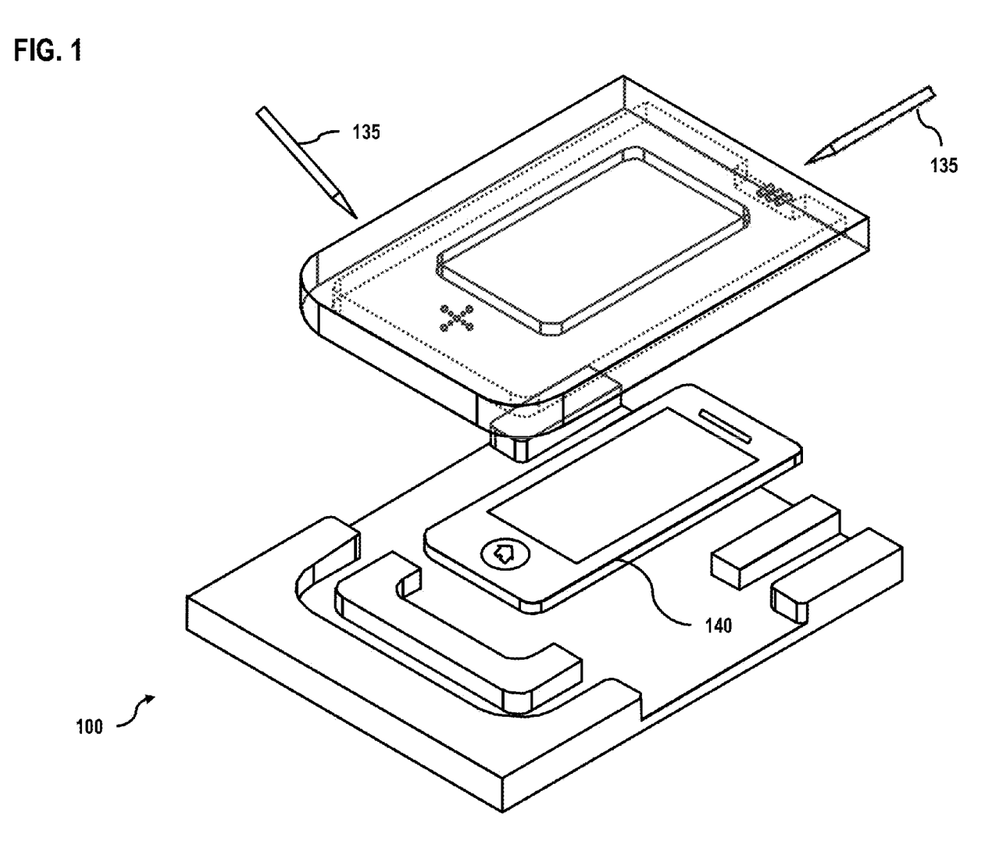
FIG. 1 is a diagram illustrating a testing assembly, according to one embodiment.

FIG. 1 is a diagram which illustrates a testing assembly 100 for portable devices in accordance with at least one embodiment. The testing assembly 100 includes a base 110, a top mold 120, and a stylus 135. The base 110 includes a mounting surface 112 upon which a portable device 140 may be mounted in order to facilitate performance of the required diagnostic tests. Portable devices typically include a user interface which allows interaction with various applications and functions. For example, portable devices such as mobile phones can allow the user to establish a short range wireless connection (e.g., WiFi or Bluetooth) by enabling certain features using the interface. The user interface can include tactile-type buttons as well as a display with touch responsive capabilities. As used herein, touch responsive components can include any surface capable of monitoring and detecting touch input. Furthermore, touch responsive components can incorporate resistive or capacitive operation.

The display is also used to convey visual information and feedback to the user. Depending on the specific portable device, speakers can be provided to output sound. According to at least one embodiment, the portable device can further include a microphone capable of functioning as part of the user interface by monitoring and detecting voice input. Over prolonged usage, it is sometimes possible for the user interface to develop malfunctions. It is also possible for a user to detect perceived malfunctions (i.e., a false error) based on individual user operation and/or habits. According to one or more embodiments, the diagnostic tests can be designed to detect and/or confirm malfunctions in the user interface.

Figure 2:
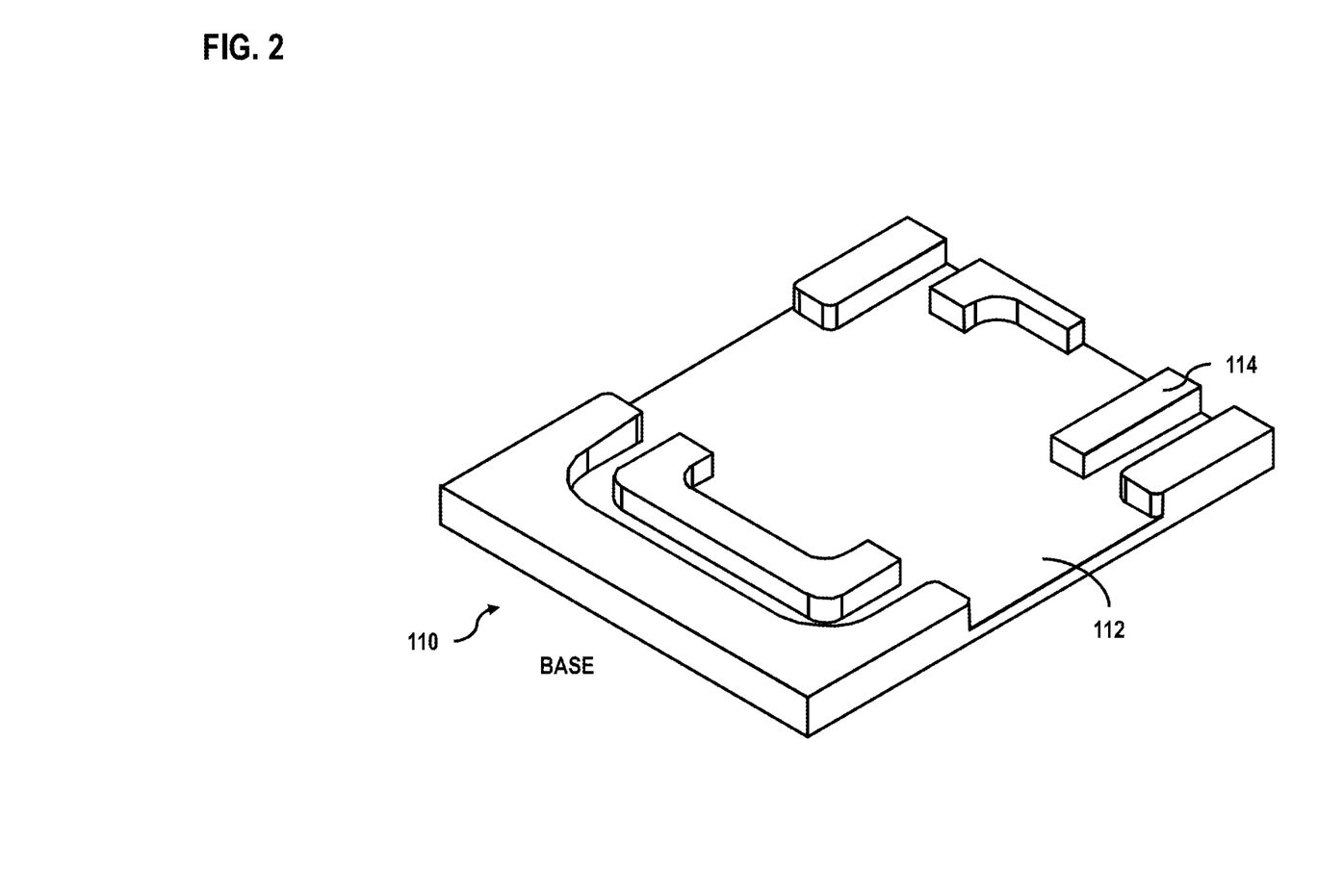
FIG. 2 is a top elevational view of the base shown in FIG. 1, according to one embodiment.

Referring additionally to FIG. 2, the mounting surface 112 can be substantially flat in order to allow generally level placement of the portable device 140. Alternatively, the base 110 can be configured to correspond with curved surfaces of the portable device in order to provide uniform pressure distribution. The base 110 also includes a molded pattern 114 that is formed in the general size and shape of the portable device 140 being tested. The base 110 can be constructed from various materials such as, for example, metal, wood, plastic, composites, etc.

As can be appreciated, portable devices can be of various sizes and shapes, depending on the manufacturer. As technology improves, however, it is conceivable that the size of certain portable devices may increase, while that of others may decrease. Still other portable devices may remain at a generally accepted, or standard, size. There are three types of portable devices that currently enjoy increased popularity. These include mobile phones, small tablets (e.g., 6-8 inches), and large tablets (e.g., 9-11 inches). Additionally, there exist numerous variations even among the three general groups of popular portable devices. Mobile phones, for example, vary in size and aspect ratio depending on manufacturer design and features. Tablets, both small and large, also have different variations due to aspect ratios and manufacturer features. For example, two tablets which have identical screen sizes (diagonal) can have different physical dimensions and shapes depending on a manufacturer's placement of interface buttons, speakers, etc. Accordingly, it should be appreciated that the base 110 illustrated in FIGS. 1 and 2 can be constructed for receiving specific devices. Additionally, the base 110 can be ideally integrated into a testing facility designed to examine and/or test a specific model of portable devices, or a specific assembly line for testing the portable device during production.

Figure 3:
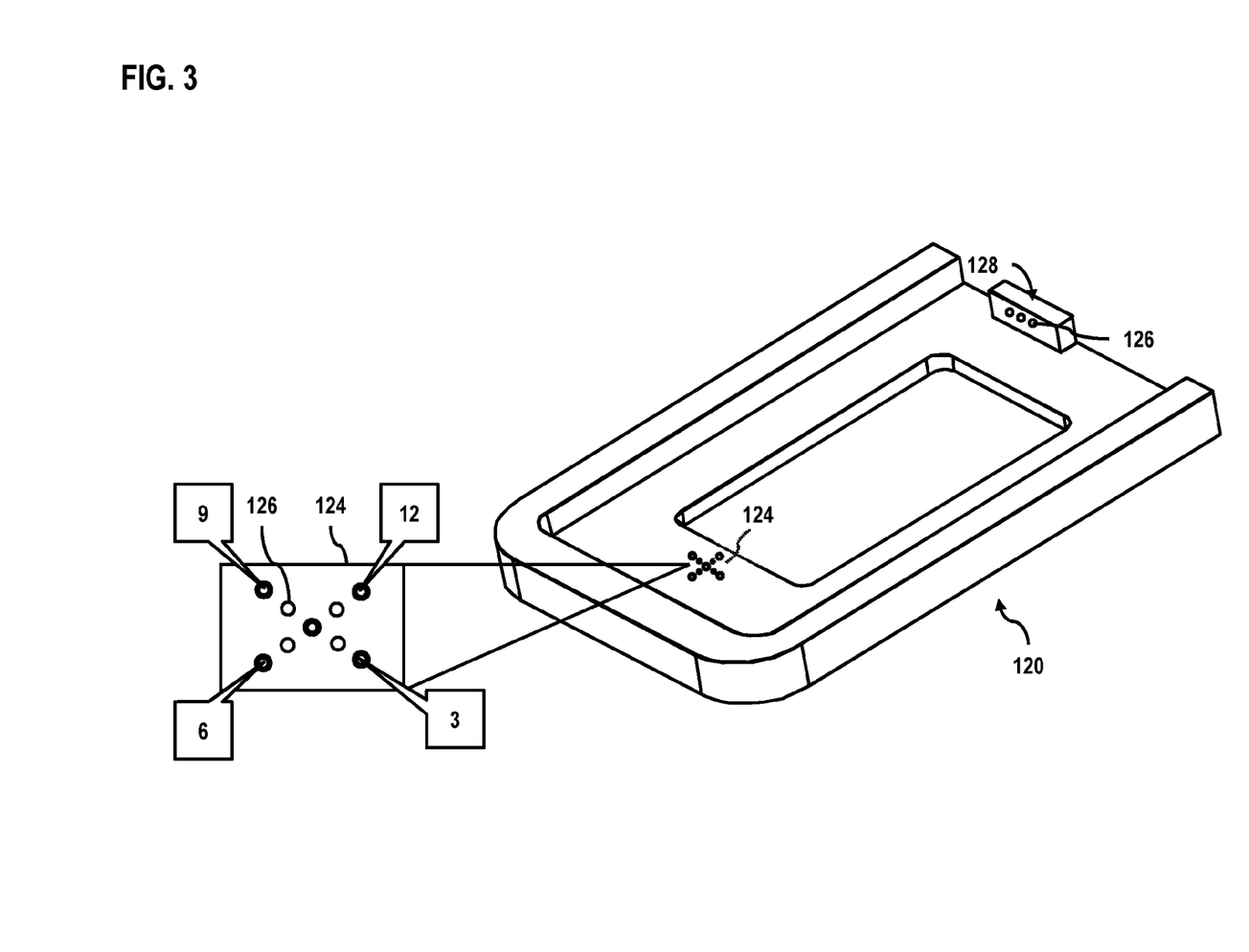
FIG. 3 is a bottom elevational view of top mold shown in FIG. 1, according to one embodiment.

Referring additionally to FIG. 3, the testing assembly 100 also includes a top mold 120 that is configured to fit within the molded pattern 114 formed on the base 110. According to other embodiments, however, the top mold 120 can also be configured to fit around the molded pattern 114, or otherwise engage it, in order to safely immobilize the portable device 140. According to the illustrated embodiment, the top mold 120 includes sidewall 122s that are designed to fit within the molded pattern 114 of the base 110. The top mold 120 also includes at least one template 124 which contains a plurality of apertures, or access holes 126. Together, the access holes 126 define a test pattern which can be positioned at a particular location where a test must be conducted on the mobile device. Thus, the test pattern can be designed specifically for the portion of the portable device 140 that will be tested. The top mold 120 also includes an auxiliary test pattern 128 that is formed on one of the sidewalls 122. Depending on the portable device being tested, the auxiliary test pattern 128 can provide access holes 126 for testing buttons having a tactile feedback configuration such as a power button. Thus, a plurality of access holes 126 are also provided to define the auxiliary test pattern 128.

According to one or more embodiments, the auxiliary test pattern 128 can be provided on different portions of the sidewall 122 and/or multiple portions of the sidewall 122 in order to provide access for testing different, or multiple, buttons such as volume, camera, etc. According to at least one embodiment, the stylus 135 is configured for insertion into the access holes 126 of the template 124 and the auxiliary test pattern 128. In particular, the tip portion of the stylus 135 is sized such that it can be inserted within the access holes 126 with substantially little variations. Therefore, repeated insertion of the stylus 135 within the same access hole results in engagement (or contact) with the portable device 140 at substantially the same location. Such a feature allows testing of the same feature, or portion, of the portable device 140 by different operators to achieve substantially similar results, or very little variations.

Once the portable device 140 has been placed on the mounting surface 112 of the base 110, it is immobilized by placement of the top mold 120 over the base 110. Additionally, the template 124 and auxiliary test pattern 128 are both aligned with specific portions of the illustrated mobile phone. The access holes 126 on the template 124 are designed to facilitate proximity testing of different portions of the portable device 140. For example, in order to test a particular button, the access holes 126 on the template 124 can be formed to allow multiple contact locations at different points on the button. If a touch responsive control surface is being tested, the access holes 126 on the template 124 can be formed to provide a grouping of points on and around the desired location on the control surface, thus allowing an operator to test both the feature and proximate sensitivity.

Figure 4A:
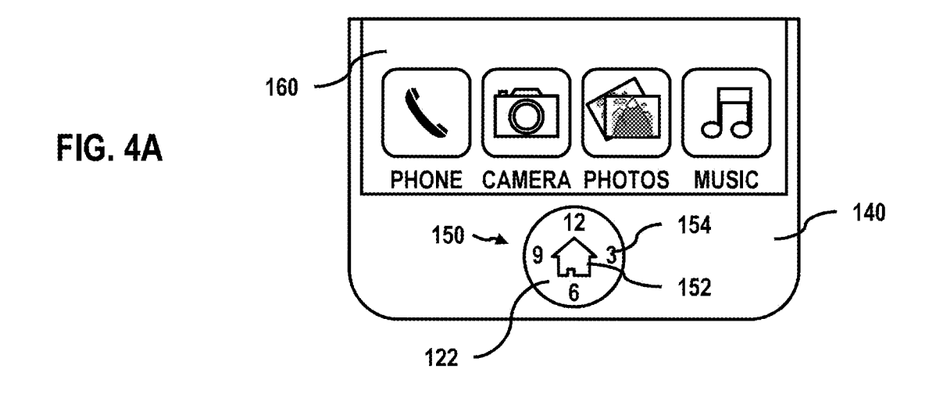
FIG. 4A illustrates a portion of portable device that can be tested with the testing assembly, according to one embodiment.
Figure 4B:
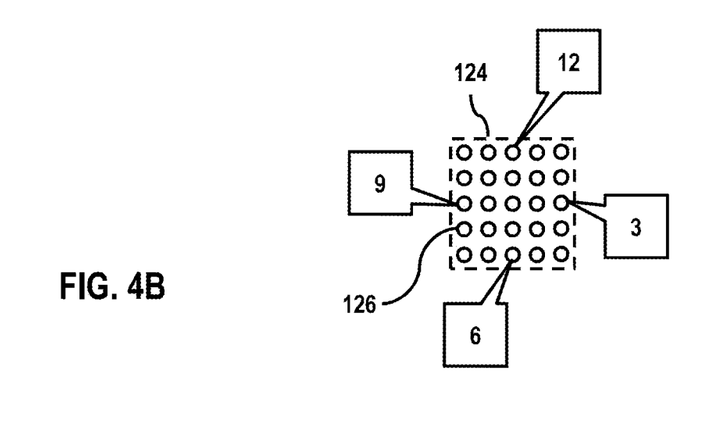
FIG. 4B illustrates a template that can be used in testing the portable device, according to one embodiment.

FIGS. 4A and 4B illustrate a portion of a portable device 140, such as mobile phone, and a template 124 configuration in accordance with at least one embodiment. The illustrated portion of the portable device 140 shows a control area, generally identified by reference numeral 150, which allows a user to perform various functions. For example, the control area includes a centrally disposed tactile feedback button 152 and one or more composite buttons 154 which incorporate both tactile feedback as well as touch responsive capabilities. Additionally, the area generally occupying the same circumferential location between the composite buttons 154 may also be configured as a touch responsive control surface 156. In order to test the control area 150 of this particular portable device 140, at least one embodiment configures the template 124 with a plurality of access holes 126 which corresponds to different portions of the control area 150. Accordingly, once the portable device 140 is immobilized within the testing assembly 100, the template 124 provides access to all of the required portions of the control area 150 through the access holes 126.

It should be appreciated that the pattern of access holes 126 shown in FIG. 4B is only intended to be illustrative, and not restrictive. Any desired pattern can be utilized depending on the shape of the area being tested. For example, the pattern of access holes 126 can have a rectangular configuration for testing a tactile feedback button having a rectangular shape. Furthermore, the patter can include an increased number of access holes 126 in order to provide flexibility for testing buttons and/or areas having different configurations. For example, the level of precision in accessing the test area can be improved by increasing the density of access holes 126 in the template 124. The size and shape of the template 124 can vary in order to accommodate specific buttons and test areas. Accordingly, the template 124 can have a shape which corresponds to that of the button or test area, or can be oversized with a high density of access holes 126 in order to generically accommodate different shapes of buttons and test areas.

Figure 5:
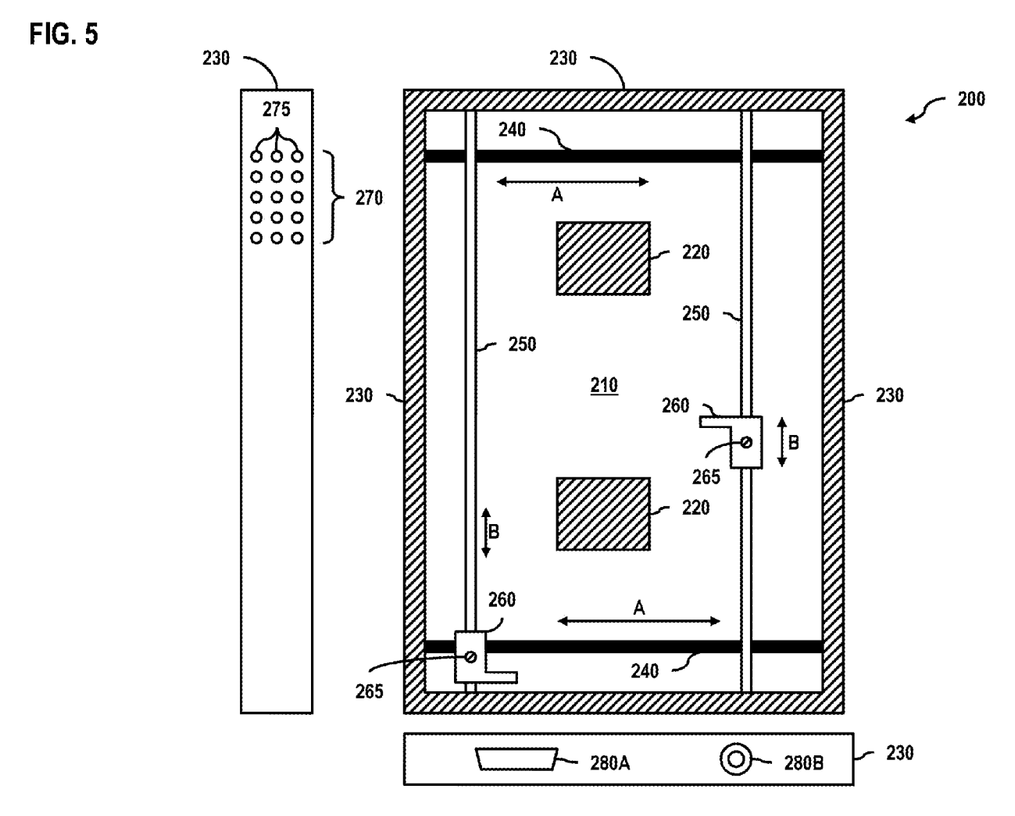
FIG. 5 is a diagram illustrating a base for a testing assembly, according to one embodiment.

FIG. 5 illustrates a base 200 for a testing assembly in accordance with at least one embodiment. The base 200 illustrated in FIG. 5 advantageously facilitates various adjustments in order to accommodate portable devices having a range of different sizes and aspect ratios. The base 200 can include, for example, a bottom surface 210 and one or more mounting surfaces 220 (or mounts) upon which the portable device can be placed. The base 200 also includes a plurality of sidewalls which extend perpendicularly from the bottom surface 210. According to at least one embodiment, the sidewalls can be formed such that they are continually connected to each other. Alternatively, the sidewalls can be configured as independent portions with spaces which separate them from each other. A pair of tracks 240 extend substantially horizontally from one sidewall to the opposing sidewall. Although two tracks 240 are illustrated, certain embodiments may only require one track 240, while other embodiments may accommodate more than two tracks 240. Furthermore, the tracks 240 can extend integrally from the bottom surface 210 of the base 200, or they can be attached to the bottom surface 210 of the base 200 using any appropriate method. The tracks 240 can also be secured to the sidewalls, or inserted within the sidewalls in order to provide the requisite level of stability.

At least one platform is provided for movement along the tracks 240. The direction of movement is generally indicated by the horizontal directional arrows (A) shown in the figure. The platforms 250 allow the base 200 to be adjusted such that portable devices of different sizes can be accommodated. More particularly, the platforms 250 can be adjusted to the width of the portable device. According to various embodiments, the base 200 can be configured to include a single platform for engaging one side of the portable device, while the other side is stationary along the sidewall of the base 200. Once adjusted to the appropriate size, the platform can be secured (or locked) in place.

According to the illustrated embodiment, a clamp 260 is provided on each platform. The clamps 260 are capable of independent movement along their respective platforms 250, as indicated by the vertical directional arrows (B). By adjusting the position of the clamps 260, it is possible for the base 200 to accommodate portable devices having different lengths. According to various embodiments, the clamps 260 can be adjusted in combination with the platforms 250 to control positioning of the portable device on the base 200. For example, adjusting the platforms 250 an equal distance from their respective sidewalls can effectively center the portable device with respect to the horizontal axis, while similar adjustments of the clamps 260 can center the portable device with respect to the vertical axis. As can be appreciated, further adjustment of the platforms 250 and clamps 260 can position the portable device at different locations within the base 200. Furthermore, the range of locations can vary depending on the actual size of the portable device. A small portable device will result in greater variations for the location, whereas a large portable device may have a more limited range of locations. Once the clamps 260 have been adjusted to the length of the portable device, they can be secured in that location using any appropriate mechanism such as, for example, the illustrated screw mechanism. Specifically, a screw 265 can be inserted through the clamp 260 such that a frictional lock can be obtained with the platform by tightening the screw 265, thereby preventing movement of the clamp 260. According to other embodiments, different types of mechanisms can be used to releasably secure the clamps 260.

FIG. 5 also includes a side elevational view of the base 200, which illustrates an auxiliary test pattern 270 that is formed on one of the sidewalls 230. The auxiliary test pattern 270 contains a plurality of access holes 275 that can correspond, for example, to the location of volume buttons provided on the portable device. According to at least one embodiment, the auxiliary test pattern 270 can extend the entire length of the sidewall 230 in order to account for various button positions as well as portable devices of different sizes. In addition to the auxiliary test pattern 270, the base 200 can include port openings which correspond to the location of communication ports of the portable device. According to one embodiment, for example, the base 200 can include a micro universal serial bus (USB) port 280A and/or a charging port 280B. Such openings can allow an operator to test problems related to charging and or communication. According to other embodiments, the port openings can correspond to the location of communication ports such as high definition media interface (HDMI), micro HDMI, USB type A, etc.

Figure 6:
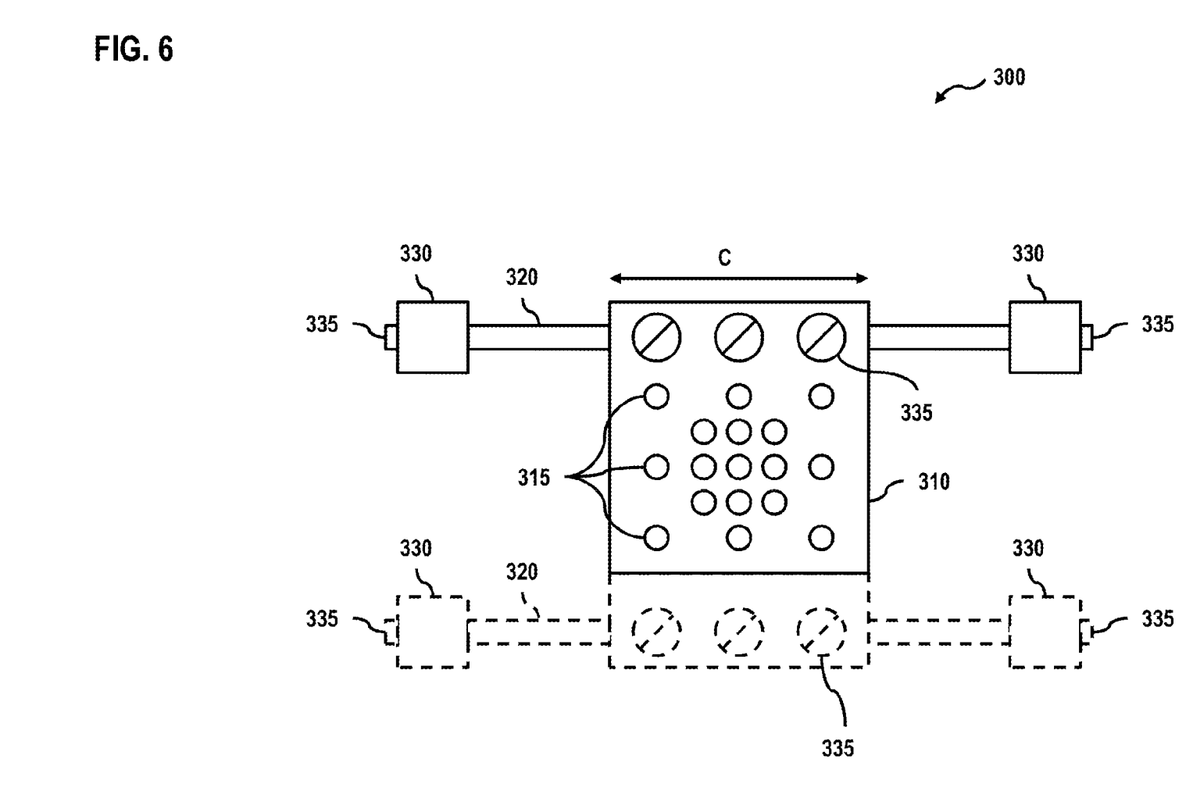
FIG. 6 is a diagram illustrating a template assembly for use with the base shown in FIG. 5, according to one embodiment.

FIG. 6 illustrates a template assembly 300 according to at least one embodiment. The template assembly 300 includes at least one rail 320 which can be used for mounting onto the base 200, and a stage 310 that is mounted on the rail 320. As illustrated in FIG. 6, the template assembly can include additional rails 320, as depicted by the broken lines. The template assembly can be specifically configured for mounting on the sidewall 230 of the base 200. For example, the length of the rail 320 can be selected such that it extends from one sidewall 230 to another. According to one or more embodiments, the template assembly can be further configured to move in the same direction as the clamps 330. According to other embodiments, the template assembly can be configured for mounting and/or movement along the platforms 250. For example, the rails 320 can be configured such that the length is adjustable in order to accommodate for movement of the platform 250.

According to at least one embodiment, the length of the stage 310 can correspond to the distance between sidewalls 230 of the base 200. Other embodiments provide a shorter length that is movable on the rails 320, as depicted by the directional arrow (C). A locking mechanism can be further provided to secure the stage 310 at a desired location. For example, one or more screws 335 can be inserted through the stage 310 in order to contact the rail 320. The stage 310 can thus be locked into position by tightening the screws 335. Alternatively, different locking mechanisms can be used to prevent movement of the stage 310 relative to the rail 320. The stage 310 also contains a plurality of access holes 315 that can be aligned with a desired portion (or location) on the portable device.

According to the embodiment illustrated in FIG. 6, the template assembly includes a clamp 330 at each end of the rail 320 and a locking mechanism capable of securing the clamp 330 to the sidewall 230 of the base 200. For example, one or more screws 335 can be inserted into the clamp 330 in order to prevent movement. It should be noted, however, that other types of locking mechanisms can also be used. According to other embodiments, the locking mechanism can be used to secure the clamps 330 to the platforms 250. Thus, the template assembly can be moved to any position along the lengthwise direction (B) of the base 200 (see FIG. 5) and secured at the desired length position. The template assembly can therefore be adjusted along the two axes represented by directional arrows (A, B) shown in FIG. 5 in order to align the access holes 315 with a desired position on the portable device.

Figure 7:
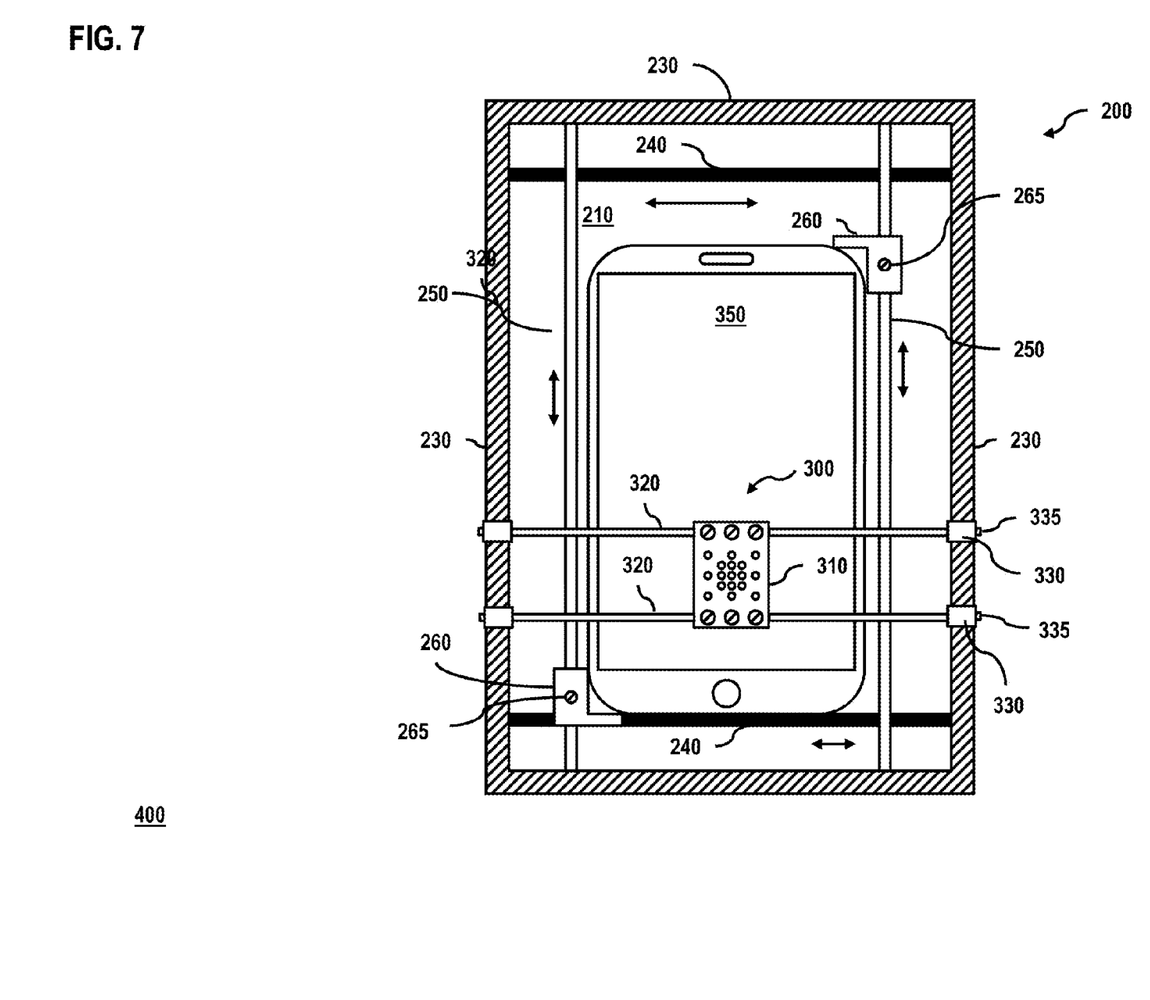
FIG. 7 is a diagram of a portable device within a testing assembly utilizing the base shown in FIG. 5, according to one embodiment.

FIG. 7 illustrates a portable device mounted in a testing assembly 400 in accordance with at least one embodiment. The illustrated testing assembly 400 includes the base 200 shown in FIG. 5 and the template assembly of FIG. 6. The portable device can be, for example, a small tablet 350 which requires adjustment of the base 200. Accordingly, the platforms 250 have been moved along the tracks 240 in order to accommodate the width of the tablet 350. The clamps 260 have also been adjusted along the platform 250 in accordance with the length of the tablet 350. Once the platforms 250 and clamps 260 have been moved to the necessary positions, they are locked in place in order to prevent movement of the tablet 350. The template assembly can be adjusted such that it is disposed over a desired area to be tested. According to the illustrated embodiment, the rails 320 of the template assembly are elongated in order to facilitate mounting on the sidewalls 230 of the base 200. The template assembly can therefore be aligned to the appropriate position along the length of the tablet 350. According to other embodiments, the rails 320 can have adjustable lengths in order to accommodate mounting on the platforms 250. The stage 310 can subsequently be moved along the rails 320 until positioned at a location corresponding to the area of the tablet 350 where testing will be performed. Once the template assembly has been properly positioned, the operator can perform any required tests on the tablet 350.

More particularly, according to at least one embodiment, the plurality of access holes 315 in the stage 310 can be addressed using a 2 dimensional coordinate system (e.g., X-Y, row-columns, etc.). Thus, each individual access hole 315 can have a unique address such as, for example, row (4)-column (3). Such a configuration allows identification of specific access holes 315 to be utilized when testing a particular device. For example, if a button or test area has a rectangular shape, it may only be necessary to utilize the access holes 315 within two rows in order perform the necessary testing. Likewise, if the button or test area has a circular or square configuration, the number and/or position of the access holes 315 required for comprehensive testing may vary from each other or that of a rectangular test area. According to other embodiments, the coordinates which identify the location of access holes 315 for testing a particular portable device or tablet 350 can be incorporated into the testing procedures, thereby allowing multiple operators to repeat the tests using the same set of access holes 315. Such a configuration also provides an ability to analyze the consistency of test results.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. An apparatus comprising:
   a base having at least one mounting surface for receiving a portable device thereon;
   a sizing mechanism configured for adjustment along at least two axes of the base to receive the portable device based on a size of the portable device;
   at least one template containing a plurality of apertures forming a test pattern; and
   a stylus that engages the portable device at different locations through the test pattern while the portable device is mounted to the base,
   wherein consistent results can be obtained from repeated engagement of the stylus at the different locations.

2. An apparatus of claim 1, further comprising:
   a template assembly configured for mounting on the base and for receiving the at least one template thereon, and
   wherein the at least one template is configured for movement on the template assembly to align the test pattern with a predetermined portion of the portable device.

3. An apparatus of claim 1, further comprising:
   a plurality of sidewalls extending from the base,
   wherein at least one of the plurality of sidewalls contains a plurality of apertures forming an auxiliary test pattern, and
   wherein the stylus is further configured for engaging the portable device through the auxiliary test pattern.

4. An apparatus of claim 1, further comprising:
   a plurality of sidewalls extending from the base, and
   wherein at least one of the plurality of sidewalls contains port openings for testing a port of the mobile device.

5. An apparatus of claim 1, further comprising:
   a sidewall extending from a side portion of the base; and
   one or more tracks disposed on the base and oriented perpendicularly to the sidewall,
   wherein the one or more tracks define one of the axes for adjusting the sizing mechanism.

6. An apparatus of claim 5, wherein the sizing mechanism comprises:
   a platform adapted for movement along the one or more tracks; and
   at least one clamp configured for movement along the platform and for locking at a selected position on the platform,
   wherein the platform can be adjusted to a width of the portable device, and the at least one clamp can be adjusted to a length of the portable device.

7. An apparatus of claim 6, further comprising:
   a second sidewall extending from a second side portion of the base that is opposite the side portion; and
   a template assembly configured for mounting on the sidewall and the second sidewall, and configured for receiving the at least one template thereon,
   wherein the at least one template is configured for movement on the template assembly to align the test pattern with a predetermined portion of the portable device.

8. An apparatus of claim 1, wherein the sizing mechanism comprises:
   one or more tracks disposed on the base and oriented along a first of the at least two axes;
   a first platform and a second platform oriented along a second of the at least two axes, and adapted for movement along the one or more tracks;
   at least one first clamp configured for movement along the first platform and for locking at a selected position on the first platform; and
   at least one second clamp configured for movement along the second platform and for locking at a selected position on the second platform,
   wherein the first platform and the second platform are adjustable to a width of the portable device, and
   wherein the at least one first clamp and the at least one second clamp are lockable at a position corresponding to a length of the portable device.

9. An apparatus of claim 8, further comprising:
   a template assembly configured for mounting on the first and second platforms, and configured for receiving the at least one template thereon, wherein the at least one template is configured for movement on the template assembly to align the test pattern with a predetermined portion of the portable device, and wherein the template assembly is adjustable for accommodating movement of the first and second platforms.

10. An apparatus of claim 1, wherein the stylus is configured to engage a tactile portion of the portable device.

11. An apparatus of claim 1, wherein the stylus is configured to engage a touch responsive portion of the portable device.

12. An apparatus of claim 1, wherein the portable device is a mobile phone.

13. An apparatus of claim 1, wherein the portable device is one of a small tablet, large tablet, and personal digital assistant (PDA).

* * * * *